(12) United States Patent
McNeil-Yeckel et al.

(10) Patent No.: US 8,511,297 B2
(45) Date of Patent: Aug. 20, 2013

(54) ACTUATOR-BASED DRIVE SYSTEM FOR SOLAR COLLECTOR

(75) Inventors: Christopher D. McNeil-Yeckel, Skaneateles, NY (US); Peter F. Kaido, Oneida, NY (US)

(73) Assignee: Young & Franklin, Inc., Liverpool, NY (US)

( * ) Notice: Subject to any disclaimer, the term of this patent is extended or adjusted under 35 U.S.C. 154(b) by 563 days.

(21) Appl. No.: 12/787,488

(22) Filed: May 26, 2010

(65) Prior Publication Data

US 2010/0300429 A1  Dec. 2, 2010

Related U.S. Application Data

(60) Provisional application No. 61/181,065, filed on May 26, 2009.

(51) Int. Cl.
*F24J 2/38* (2006.01)

(52) U.S. Cl.
USPC ........... 126/600; 126/604; 126/605; 126/692; 126/694; 126/696

(58) Field of Classification Search
USPC ................. 126/571, 600, 603, 604, 605, 692, 126/694, 696, 701; 298/22 J, 22 D; 74/490.01
See application file for complete search history.

(56) References Cited

U.S. PATENT DOCUMENTS

| 4,006,782 A * | 2/1977 | Nishino et al. ................. 172/815 |
| 4,008,771 A * | 2/1977 | Tomio ........................... 172/815 |
| 4,038,972 A | 8/1977 | Orrison |
| 4,079,725 A | 3/1978 | Chadick |
| 4,172,443 A | 10/1979 | Sommer |
| 4,178,913 A | 12/1979 | Hutchison |
| 4,195,620 A | 4/1980 | Rust |
| 4,203,426 A | 5/1980 | Matlock et al. |
| 4,249,514 A * | 2/1981 | Jones ............................ 126/605 |
| 4,264,145 A | 4/1981 | Urruela |

(Continued)

FOREIGN PATENT DOCUMENTS

| EP | 2 000 752 A2 | 10/2008 |
| ES | 473356 | 11/1979 |

(Continued)

OTHER PUBLICATIONS

Spanish State of the Art Report for Spanish Application No. 2010000707; mailed Jun. 28, 2012; 4 pages.

*Primary Examiner* — Kenneth Rinehart
*Assistant Examiner* — Jorge Pereiro
(74) *Attorney, Agent, or Firm* — Hiscock & Barclay, LLP

(57) ABSTRACT

A system for controlling the rotational position of a solar collector trough includes a hydraulic cylinder having an output end and a linkage assembly. The linkage assembly includes at least one linkage member and a pair of pivot arms attached to the at least one linkage member. The pair of pivot arms is defined by a first pivot arm and a second pivot arm, each arm being pivotally attached to the at least one linkage member and the trough. The first and second pivot arms form respective parallel horizontal first and second pivot axes enabling the trough to be entirely movable over an angular range of motion extending over 180 degrees based totally on the linear movement of the output end of the hydraulic cylinder and in which an actuator control circuit controls the relative displacement of the cylinder output end.

18 Claims, 6 Drawing Sheets

(56) References Cited

U.S. PATENT DOCUMENTS

| | | |
|---|---|---|
| 4,297,521 A | 10/1981 | Johnson |
| 4,306,540 A | 12/1981 | Hutchison |
| 4,345,582 A | 8/1982 | Aharon |
| 4,353,003 A | 10/1982 | Sommers |
| 4,458,670 A | 7/1984 | Lhenry |
| 4,638,680 A | 1/1987 | Albrecht |
| 4,930,493 A | 6/1990 | Sallis |
| 5,022,929 A | 6/1991 | Gallois-Montbrun |
| 5,108,247 A | 4/1992 | Vlaanderen |
| 5,228,924 A * | 7/1993 | Barker et al. ............... 136/246 |
| 5,275,249 A | 1/1994 | Nelson |
| 5,469,182 A * | 11/1995 | Chaffee ...................... 343/882 |
| 5,512,742 A * | 4/1996 | Mattson ................... 250/203.4 |
| 5,542,203 A | 8/1996 | Luoma et al. |
| 5,600,124 A | 2/1997 | Berger |
| 5,656,161 A * | 8/1997 | Solomon et al. ............. 210/232 |
| 5,730,117 A | 3/1998 | Berger |
| 5,757,335 A | 5/1998 | Kaneff et al. |
| 5,758,938 A | 6/1998 | Osterwisch |
| 5,787,878 A | 8/1998 | Ratliff, Jr. |
| 6,058,930 A | 5/2000 | Shingleton |
| 6,123,067 A | 9/2000 | Warrick |
| 6,276,359 B1 | 8/2001 | Frazier |
| 6,284,968 B1 | 9/2001 | Niesyn |
| 6,552,257 B1 | 4/2003 | Hart et al. |
| 6,953,038 B1 | 10/2005 | Nohrig |
| 7,513,250 B2 | 4/2009 | Head et al. |
| 2005/0284467 A1 | 12/2005 | Patterson |
| 2006/0044511 A1 | 3/2006 | Mackamul |
| 2007/0012312 A1 | 1/2007 | Hayden |
| 2007/0204860 A1 | 9/2007 | Rose |
| 2008/0230047 A1 | 9/2008 | Shugar et al. |
| 2008/0236567 A1 | 10/2008 | Hayden |
| 2010/0280668 A1 * | 11/2010 | Puura ........................... 700/282 |

FOREIGN PATENT DOCUMENTS

| | | |
|---|---|---|
| KR | 2009-0011838 | 2/2009 |
| KR | 2009-0037100 | 4/2009 |
| KR | 2009-0011386 | 8/2009 |

* cited by examiner

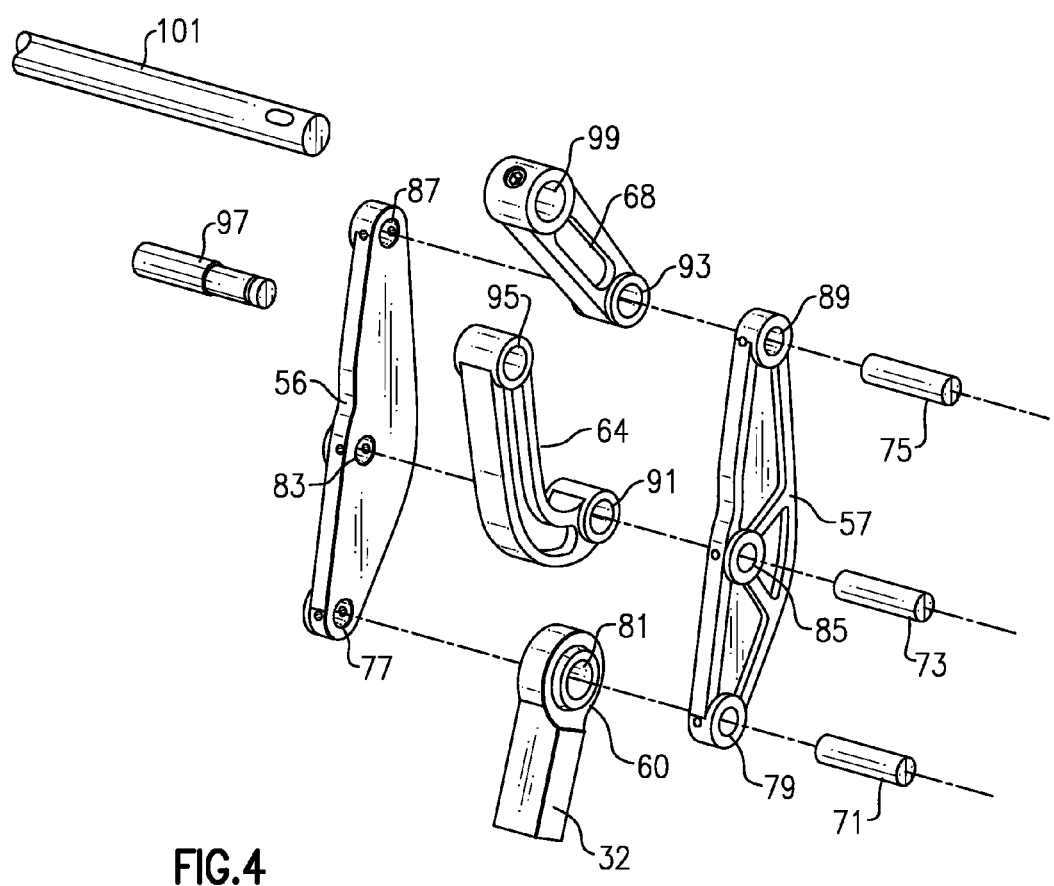
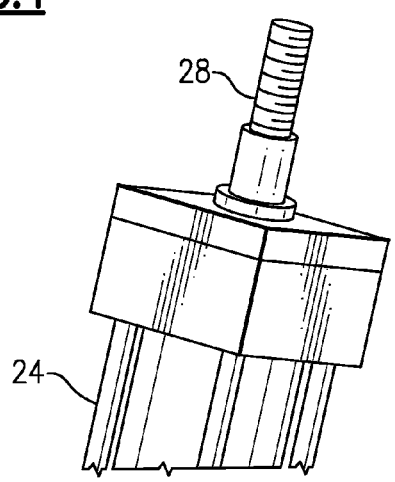
FIG.4

ACTUATOR-BASED DRIVE SYSTEM FOR SOLAR COLLECTOR

CROSS REFERENCE TO RELATED APPLICATION

This application claims priority under relevant portions of 35 U.S.C.§119 to a provisional application, U.S. Ser. No. 61/181,065, filed May 26, 2009, the contents of which is herein incorporated by reference in its entirety.

FIELD OF THE INVENTION

The invention relates generally to a mechanism for driving a solar collector and in particular to a mechanism that allows a solar collector to be driven between various sun tracking positions, as well as service and storage positions using a single linear actuator.

BACKGROUND OF THE INVENTION

A number of techniques are known for use in alternative power sources based on solar energy. For example, solar cells are often used to convert solar energy into electricity. Examples of these devices are found in remote locations to power pumps, lights, telecommunication devices and the like. There are also devices that utilize solar energy, such as water heating devices. Solar collector systems employ large reflectors, or arrays of smaller reflectors supported by means of a suitable framework. The reflectors of such systems employ photovoltaic solar panels and more recently parabolic solar troughs. The troughs retain a plurality of curved mirrors in order to concentrate sunlight on glass and steel receiver tubes. Fluid circulating through the tubes can reach temperatures as high as 750 degrees Fahrenheit and can be used in order to generate steam, which drives a turbine and generator to produce electricity.

The effectiveness of these devices is generally improved if the device can track the position of the sun in order for the device to absorb as much energy as possible. Therefore, such devices also generally include some form of solar tracking apparatus in order to track the relative position of the sun wherein the collector is incrementally moved in concert with the sun in order to maintain alignment.

To effectively concentrate solar energy in the operation of any of such systems, the solar concentrator or parabolic trough must rotate azimuthally each day from a generally east-facing direction at sunrise to a generally west-facing direction at sunset. It is also advantageous to place the solar concentrator or trough in a downward facing direction when stowing the solar collection system when the system is not operating (i.e., at night) and/or in a repair or service position.

The installed cost of the actuation/drive system used in connection with solar collection systems is a major driver in terms of their requirements. A key to the success of solar power systems is reducing the capital expenditure for the power plant owners while maintaining efficient and repeatable operation. As noted, requirements for solar collectors include an angular range of motion of 180 degrees for sun tracking and 240 degrees total for enabling storage and maintenance of the collector trough, in the case of a parabolic trough. Moreover, the actuator system must be configured to tolerate high torque capacities based on normal operation including normal wind and environmental loads, as well as loads created during the intended operational life of the system, while also guaranteeing positional accuracy (e.g., 0.1 degrees).

Electromechanical drive systems have been considered for use in solar collector systems in which a motor enables rotary motion through a geared transmission, this motion being imparted to the trough or concentrator portion of the collector. A functional benefit is that such systems permit continuous motion, but the costs for gear-driven assemblies, whether these assemblies are purchased as standard products or are specifically designed for implementation, have been determined to be prohibitive and therefore a major impediment to successful implementation of such drive systems.

There is required a drive system for a solar collector that enables a collector(s) to be effectively, accurately and repeatably driven while being effective in terms of its manufacturability and overall cost.

SUMMARY OF THE INVENTION

Therefore and according to a first aspect, there is disclosed an actuator-based tracking system for selectively varying the rotational position of a solar collector trough. The trough is rotatably supported for movement over an angular range of motion based on the relative position of the sun to the trough, in which the tracking system comprises a hydraulic cylinder having an output end and a linkage assembly interconnecting the output end of said cylinder and the trough. The linkage assembly comprises at least one linkage member and a pair of pivot arms attached to the at least one linkage member. The pair of pivot arms includes a first pivot arm and a second pivot arm, the first pivot arm being pivotally attached to a fixed portion of the trough at one end of the arm and pivotally attached to the at least one linkage member at an opposite end thereof. The second pivot arm is pivotally attached to a rotatably supported portion of the trough at one end and is pivotally attached to the at least one linkage member at an opposite end. The linkage member is pivotally attached to the output end of the hydraulic cylinder at one end and pivotally attached to each of the first and second pivot arms wherein axial movement of said output end enables said trough to be rotated over the angular range of motion. The system further includes an actuator control assembly for controlling the displacement of the output end of the cylinder.

The angular range of motion of the herein described assembly is at least 180 degrees and is preferably at least 240 degrees.

According to one aspect, the actuator control assembly includes at least one pump, a hydraulic fluid supply connected to said cylinder and said pump and valve means for directing the flow of hydraulic fluid from said hydraulic fluid supply to and from said cylinder.

The valve means according to one embodiment includes a directional control valve fluidly connected to said cylinder, wherein actuation of said directional control valve will cause hydraulic fluid flow from said fluid supply to said cylinder, said directional valve means further including a pressure compensated flow control valve for maintaining a fixed rate of fluid flow during the time period said directional control valve is actuated.

Preferably, a controller receives output to selectively actuate the hydraulic pressurization system in order to incrementally position the collector trough. According to one version, the controller receives output from sensing means for determining the relative position of the sun. Alternatively, the controller can be programmed to move the trough to predetermined positions, for example, for maintenance, storage and service.

The directional control valve is actuated for a predetermined time interval wherein the fluid supply includes a hydraulic reservoir and a fluid accumulator, the accumulator being connected to said hydraulic reservoir and said pump and serving as the fluid supply for said cylinder under said valve means.

According to one version, means are connected to the controller for determining the state of the fluid accumulator for replenishing same with hydraulic fluid, as needed. These determining means can include pressure sensing means disposed in relation to the fluid accumulator for determining the pressure thereof; for example, the pressure sensing means can include high and low pressure switches.

The system enables movement of the trough incrementally in order to track sun position, as well as continuous movement over the angular range of motion to each of a stow and a maintenance position, as needed.

According to another version, the valve means can further include a locking valve disposed between the directional valve and the hydraulic cylinder. In another version, a pair of counterbalance valves can be used to retain the fluid in the cylinder. In one version, the directional valve is a solenoid directional valve, such as a four-way directional solenoid valve.

According to one version, the at least one linkage member is pivotally attached to said output end via a prismatic joint and each of said pivot arms are attached to said at least one linkage member and said trough by revolute joints.

Preferably, the attachment of the first pivot arm to the fixed portion of said trough forms a first pivot axis and the attachment of said second pivot arm to the rotatably movable portion of said trough forms a second pivot axis parallel to said first pivot axis and enabling said trough to be entirely movable over said range of motion based on the linear movement of the output end of said hydraulic cylinder.

According to another aspect, there is disclosed a system for controlling the rotational position of a solar collector trough. The trough is rotatably supported for movement over an angular range of motion based on the relative position of the sun to the trough. The position controlling system includes a hydraulic cylinder having an output end, and a linkage assembly interconnecting the output end of said cylinder and said trough. The linkage assembly comprises at least one linkage member and a pair of pivot arms attached to said at least one linkage member. The pair of pivot arms includes a first pivot arm and a second pivot arm each pivotally attached to the at least one linkage member and the trough, wherein the attachment of the first pivot arm and the second pivot arm form respective parallel horizontal first and second pivot axes enabling said trough to be entirely movable over the angular range of motion based solely on the linear movement of the output end of said hydraulic cylinder. The system further includes an actuator control assembly for controlling the displacement of the output end of the cylinder.

According to one version, the first pivot arm is disposed intermediate to said output end and said second pivot arm.

The angular range of motion of the solar collector is at least 180 degrees according to one version and at least 240 degrees according to another version.

The actuator control assembly includes at least one pump, a hydraulic fluid supply connected to said cylinder and said pump and valve means for directing the flow of hydraulic fluid from said hydraulic fluid supply to and from said cylinder.

The valve means includes a directional control valve fluidly connected to said cylinder, wherein actuation of said directional valve will cause hydraulic fluid flow from said fluid supply to said cylinder, said valve means further including a pressure compensated flow control valve for maintaining a fixed rate of fluid flow during the time period said directional valve is actuated.

The actuator control assembly includes a controller that receives output to selectively actuate said the actuator in order to incrementally position said trough.

In one version, the controller receives output from sensing means for determining the relative position of the sun.

Preferably, the directional control valve is actuated for a predetermined time interval by the controller.

The fluid supply includes a hydraulic reservoir and a fluid accumulator, said accumulator being connected to said hydraulic reservoir and said pump and serving as the fluid supply for said cylinder under said valve means. Additional means are connected to said controller for determining the state of said fluid accumulator for replenishing same with hydraulic fluid. The determining means can includes pressure sensing means disposed in relation to said accumulator to determine the pressure thereof, such as high and low pressure switches.

The herein described system enables movement of the trough incrementally to track sun position as well as continuous movement over the angular range of motion to each of a stow and a maintenance position as needed. To that end, a bypass valve can be provided to circumvent the flow control valve for fast operation, as needed.

The valve means according to one version further includes a locking valve disposed between the directional valve and the cylinder while in yet another version a pair of counter balance valves can be similarly disposed, in parallel to retain fluid within the hydraulic cylinder. The directional valve can be a solenoid directional valve, such as a four-way directional solenoid valve.

The at least one linkage member is pivotally attached to the output end of the cylinder via a prismatic joint wherein each of the pivot arms are attached to the at least one linkage member and the trough by revolute joints.

According to yet another aspect, there is provided a method of manufacturing an actuator-based drive system for a solar collector trough, said trough being rotatably supported for movement over an angular range of motion based on the relative position of the sun to the trough, said method comprising the steps of interconnecting an output end of a hydraulic cylinder with a linkage arm, pivotally attaching a first pivot arm to said linkage arm and a fixed portion of said collector, pivotally attaching a second pivot arm to said linkage arm and said movable trough, wherein the attachment of said first pivot arm and said second pivot arm form respective parallel horizontal first and second pivot axes enabling said trough to be entirely movable over said range of motion based totally on the linear movement of the output end of said hydraulic cylinder, and providing an actuator control for controlling the displacement of said output end of said cylinder.

An advantage is that the herein described drive system is that it is simpler in terms of its overall manufacture and assembly than previously known position tracking systems, while being repeatable and efficient in enabling the collector to be driven azimuthally in a sequential manner for purposes of sun tracking and continuous movement for purposes of storage and/or maintenance of the collector. Therefore, this drive system is also cost effective.

Another advantage is that the herein described system can easily tolerate high force and torque potential loading requirements over the working life of the collector, including installation thereof, and including those caused by wind resistance and in which the overall simplicity of the system lends itself to faster repair/maintenance, as needed.

Additionally, there herein described system is scalable in order to effectively handle any required torque requirements. Moreover, the system also allows for a distributed or central hydraulic supply for handling multiple troughs.

These and other features and advantages will be readily apparent from the following Detailed Description, which should be reading in conjunction with the accompanying drawings.

BRIEF DESCRIPTION OF THE DRAWINGS

FIG. 4 is an enlarged view of a portion of the exploded assembly view of FIG. 3;

DETAILED DESCRIPTION

The following relates to an actuator-based drive system for a solar collector and more specifically to a parabolic solar reflector trough. Throughout the discussion that follows, various terms such as "top", "bottom", "distal", "proximal", "first", "second", "clockwise", "counterclockwise" and the like are used in order to provide a suitable frame of reference with regard to the accompanying drawings. These terms are not intended to be limiting of the following claims, however, except where so specifically indicated.

Figure 1:
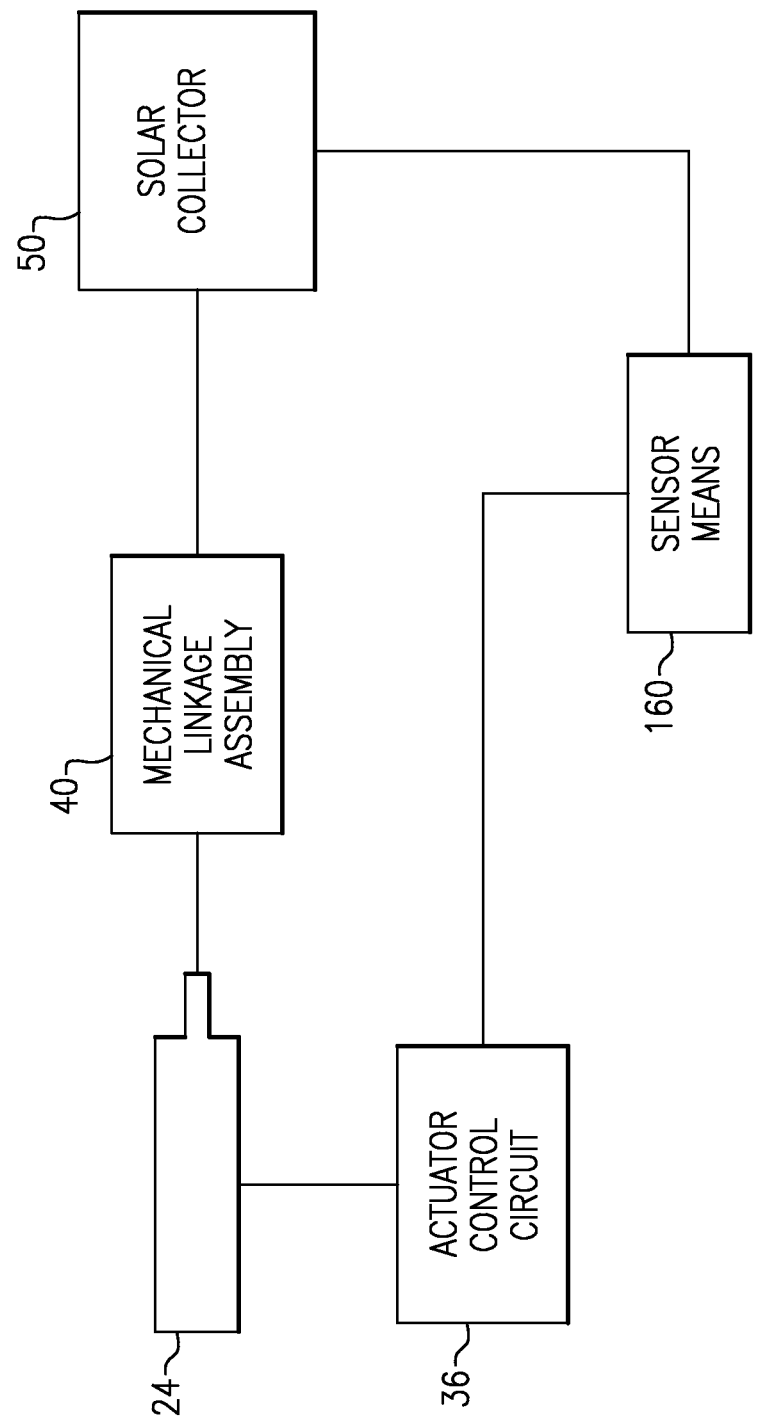
FIG. 1 is a schematic diagram of the position controlling system in accordance with a preferred embodiment.

Referring to FIG. 1, there is diagrammatically shown an embodiment of an actuator-based drive system (herein referred to by reference numeral 20) for a solar collector 50 (partially shown). The drive system 20 according to this embodiment is defined by a single linear actuator, in this instance a hydraulic cylinder 24, preferably a double acting hydraulic cylinder having an output arm 28. It will be readily apparent that multiple cylinders (not shown) can be similarly controlled, for example, for a plurality of solar collector troughs, this single version being shown for clarity. A hydraulic ram 32 is attached to the output arm 28 of the cylinder 24. The hydraulic cylinder 24 is fluidly interconnected to a hydraulic control circuit 36, while the hydraulic ram 32 is mechanically interconnected to a mechanical linkage assembly 40. As discussed herein, each of the mechanical linkage assembly 40 and the hydraulic control circuit 36 are used in concert with the hydraulic cylinder 24 in order to affect the azimuthal position of a connected solar collector 50, these assemblies now being described in greater detail.

Figure 2:
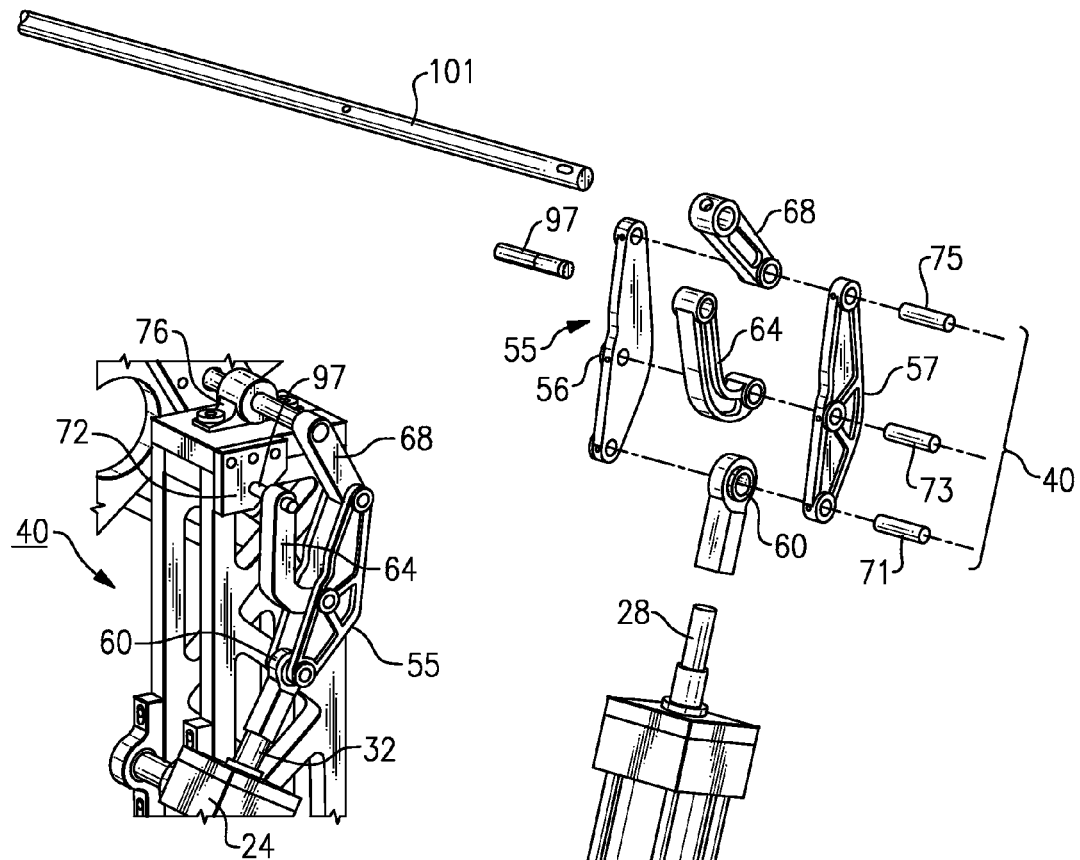
FIG. 2 is a perspective view of a portion of a linkage assembly of the position controlling system of FIG. 1, as attached to a solar collector trough.
Figure 3:
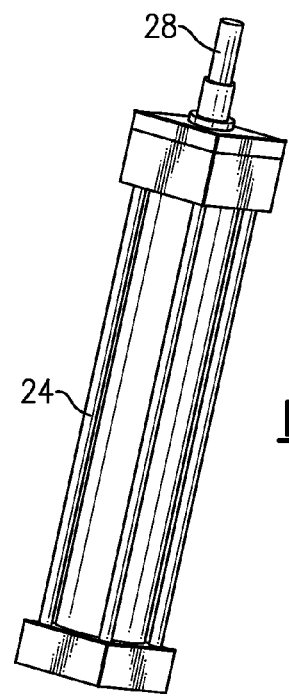
FIG. 3 is an exploded perspective view of the hydraulic cylinder and linkage assembly of the position controlling system of FIGS. 1 and 2.

Referring to FIGS. 2-4, the mechanical linkage assembly 40 of the herein described actuator-based drive system 20 is described for purposes of this embodiment. A linkage arm 55 defined by a pair of spaced parallel linkage arm plates 56 and 57 is pivotally attached to the end of the hydraulic ram 32 of the cylinder 24 by means of a prismatic joint 60 using a pivot pin 71 inserted through respective openings 77, 79 formed at the proximal end of each of the linkage plates as well as an aligned opening 81 of the prismatic joint.

A pair of pivot arms; namely, a first pivot arm 64 and a second pivot arm 68, are each pivotally attached at their proximal ends in spaced relation between the spaced linkage arm plates 56, 57 of the linkage arm 55 using pivot pins 73, 75, respectively. More specifically and according to this embodiment, the linkage arm plates 56, 57 include respective openings 83 and 85 that are aligned with an opening 91 formed at the proximal end of the first pivot arm 64 through which the pivot pin 73 is fitted. In like manner, the linkage plates 56, 57 further include respective openings 87 and 89 that are aligned with an opening 93 at the proximal end of the second pivot arm 68 through which pivot pin 75 is inserted to secure same. In this arrangement, the first pivot arm 64 is pivotally attached to the linkage arm 55 at an intermediate position relative to the distal and proximal ends of the arm while the second pivot arm 68 is pivotally attached to the linkage arm at the distal end thereof. In this configuration, the linkage arm 55 is pivotally attached to the output end 28 of the hydraulic cylinder 24 as well as the first and second pivot arms 64, 68. Alternatively and in lieu of the linkage plates 56, 57 defining a single linkage arm or member, separate linkage arms could be provided.

The distal end of the first pivot arm 64 is attached, also in pivotal fashion, to a fixed support 72 of the solar collector 50, as shown most particularly in FIG. 2. More particularly and as shown in FIGS. 2 and 4, the first pivot arm 64 includes an opening 95 provided at the distal end that is fitted onto a cylindrical projection 97 extending from the fixed support 72. The second pivot arm 68 is pivotally attached to a movable trough or trough portion 76 of the solar collector 50, the pivot arm including an opening 99 at its distal end that is attached onto a rod 101 interconnecting the trough portion, which is journaled by the rod for rotatable movement about a horizontal axis defined by said rod. The second pivot arm 68 is pinned to the rod 101 to prevent axial movement of the pivot arm, but is connected to permit pivotability of the rod itself. In passing and according to this exemplary embodiment, it should be noted that the first pivot arm 64 is defined by a substantially-L shaped configuration for reasons noted below, although it will be readily apparent that other suitable shapes or geometries can be alternatively used.

Figure 5:
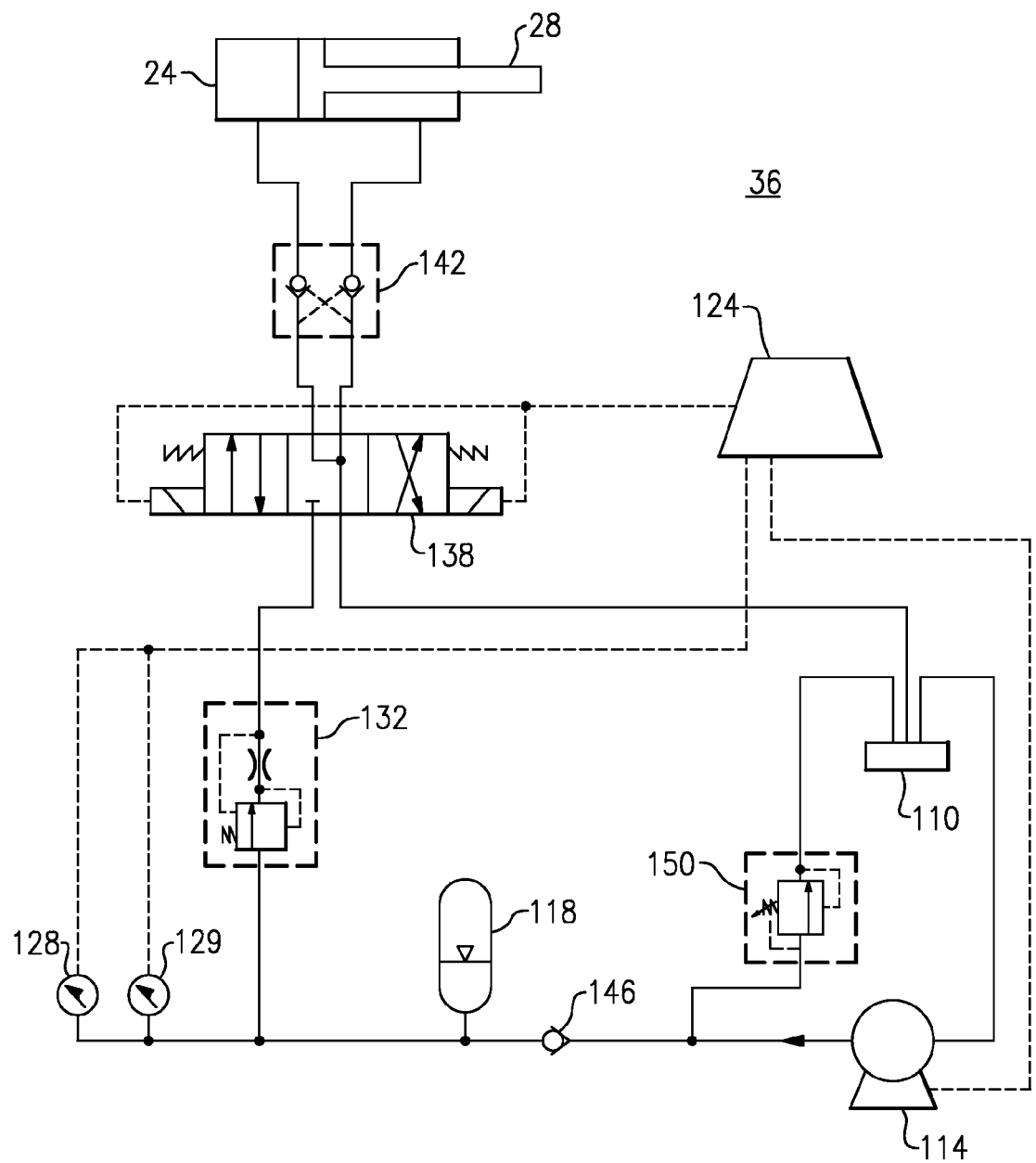
FIG. 5 is a functional schematic diagram of a hydraulic pressurization assembly of the position controlling system of FIGS. 1-4.

Referring to FIG. 5, an actuator control circuit 36 is herein described for purposes of this specific embodiment. This control circuit 36 can be housed in an enclosure (not shown) and includes a plurality of components interconnected by a resident controller 124, in this instance a program logic controller (PLC). A hydraulic reservoir 110 retains a quantity of hydraulic fluid for purposes of providing a fluid supply for the hydraulic cylinder 24. An electric-motor driven or other suitably powered pump 114 is disposed in relation to the hydraulic reservoir 110 to enable fluidic communication wherein a hydraulic accumulator 118 is intermediately disposed in relation to the reservoir 110 and cylinder 24. A check valve 146 and relief valve 150 are also each provided in relation to the hydraulic accumulator 118, pump 114 and the reservoir 110.

The actuator control circuit 36 according to this embodiment further includes a pair of pressure switches, namely a high pressure switch 128 and a low pressure switch 129 for determining the pressure of the hydraulic accumulator 124. A pressure compensated flow control valve 132, such as a fixed orifice pressure compensated restrictive-type, hydraulic flow regulating valve is disposed in relation to a directional control valve 138 and the hydraulic accumulator 118 to enable fluid from the accumulator under a constant flow rate to be provided as needed to the cylinder 24. According to this embodiment, the directional control valve 138 is a four-way solenoid directional valve wherein the fluid level is maintained within the cylinder 24 by means of a locking valve 142, such as a dual pilot-operated check valve, which is further disposed between the hydraulic cylinder 24 and the directional control valve 138.

As is apparent from the sequential views of FIGS. 6(b) through (e) in which the trough portion 76 is sequentially rotated azimuthally from a nominal stow position, FIG. 6(b), to an east facing direction, FIG. 6(c), to a noon position, FIG. 6(d), and eventually to a west facing position, FIG. 6(e), the output end 28 of the linear actuator (cylinder 24) is caused to sequentially extend outwardly by means of the actuator control circuit 36, as described in greater detail below. Alternatively, the varying positions can be created similarly based on the retraction of the cylinder 24 from an originally and fully extended position in which the hydraulic cylinder retracts inwardly based on the actuator control circuit 36.

More particularly, the movable trough portion 76 is initially disposed in the stow position, FIG. 6(b), in which the second pivot arm 68 extends linearly to an angular position which is about 30 degrees below the horizon. In this position, the output end 28 of the actuator (cylinder 24) is extended to a "nominal" position. To achieve the east-facing position, FIG. 6(c), the output end 28 of the hydraulic cylinder 24 is caused to extend linearly outwardly. This linear extension acts upon the linkage arm 55, which is caused to pivot in a counterclockwise direction along with each of the first and second pivot arms 64, 68 about the cylindrical projection 97 of the fixed support 72 and the rod 101 of the movable trough portion 76, respectively, also in a counterclockwise direction. As the pivot arms 64, 68 rotate with the linkage arm 55, the movable trough portion 76 is caused to rotate in a counterclockwise manner to the east-facing position of FIG. 6(c), to begin sun tracking.

Figure 6A:
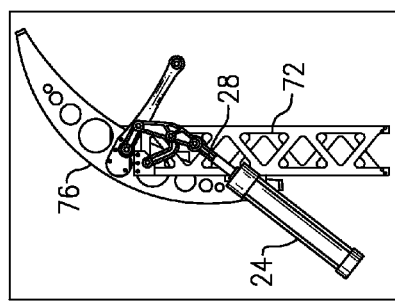
FIGS. 6(a)-(e) depict the solar collector including a portion of the position controlling system in accordance with an exemplary embodiment, the actuator and collector being shown in various positions over an intended angular range of motion.
Figure 6B:
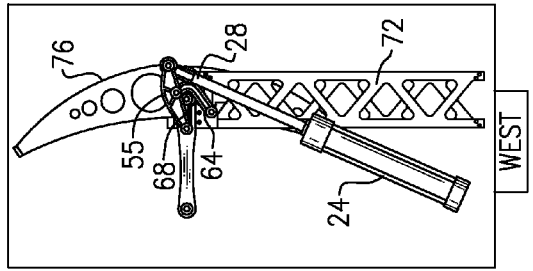
Figure 6E:
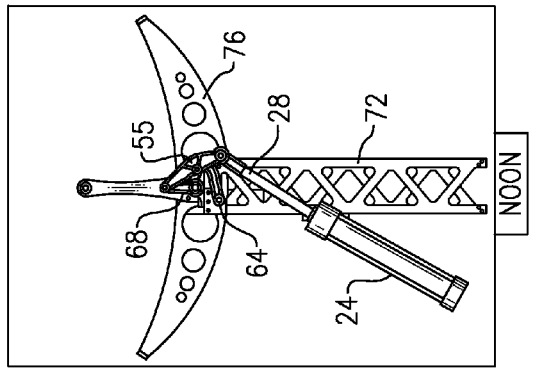
Figure 6C:
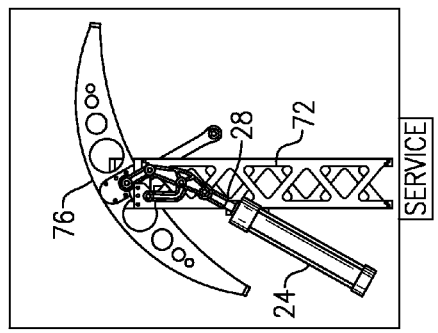
Figure 6D:
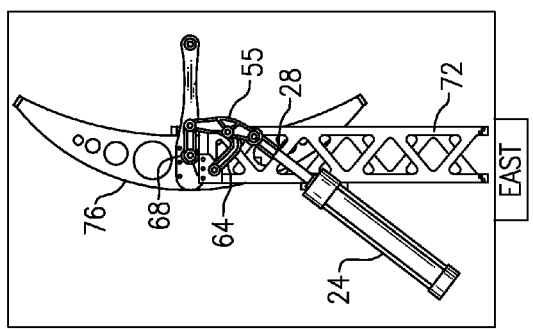

During sun tracking and as shown in FIGS. 6(c)-6(e) of this embodiment, the output end 28 of the hydraulic cylinder 24 further extends outwardly in a sequential fashion in order to effectively "follow" the movement of the sun based on controls provided by the actuator control circuit 36. As the output end 28 extends, the linkage arm 55 continues to pivot about the two pivot axes that are established by the fixed support 72 and the movable trough portion 76, respectively, as well as due to the pivotability permitted by the prismatic joint 60 between the cylinder 24 and the linkage arm. The mid-day (noon) and end of day (west) positions are depicted in FIGS. 6(d) and 6(e), respectively. Over the course of this actuator movement, the linkage arm 55 continues to rotate in a counterclockwise manner along with the first and second pivot arms 64, 68, as shown. According to this embodiment, the length and L-shape configuration of the first pivot arm 64 enables the movable trough portion 76 to be fully advanced to the west-facing position, FIG. 6(e), without interference as the distal end of the linkage arm 55 is caused to rotate with the proximal end of the second pivot arm 68 over 180 degrees between the positions of FIGS. 6(c)-6(e). Upon completion of the sun tracking phase and after the sunset, the output end 28 of the hydraulic cylinder 24 is retracted and the position of the movable trough 76 is shifted in one continuous movement to that of the stow position of FIG. 6(b), wherein the linkage arm 55 and first and second pivot arms 64, 68 are each caused to rotate in a clockwise fashion about the previously defined pivot axes.

A full retraction of the hydraulic cylinder 24 according to this embodiment permits the movable trough 76 to be shifted rotationally to a maintenance or service position, FIG. 6(a), which is about 60 degrees below the horizon as shown. Therefore and according to this embodiment, the trough portion 76 is angularly movable over a total range of 240 degrees.

Referring back to FIG. 5 and to enable any of the outwardly extending movements described above using the hydraulic cylinder 24 and mechanical linkage assembly 40, the typical operation of the herein described actuator control circuit 36 follows. As should be apparent, the output end 28 of the herein described hydraulic cylinder 24 extends outwardly based on an increase in volume of hydraulic fluid that is added to the confines of the cylinder from the fluid supply (hydraulic accumulator 118). For example and for purposes of sun tracking and in order to initiate movement of the actuator, the controller 124 will receive (or can generate internally) a command to step the linkage assembly 40 from a previous position to a new position. For purposes of this extension of the actuator, the controller 124 closes a relay for the appropriate solenoid on the directional control valve 138 for a predetermined time period. This closure enables a flow of fluid from the hydraulic accumulator 118 into the confines of the hydraulic cylinder 24. The flow control valve 132 is pressure compensated in order to meter the flow rate of fluid (regardless of the upstream pressure) to a fixed rate that must be known for calculating the duration of the solenoid command. When the solenoid releases, the locking valve 142 holds the pressure on both sides of the hydraulic cylinder 24 until the next actuator movement. Flow rate and pulse duration are determined for each incremental step of travel as dependent upon torque and angular travel defining the cylinder requirements (i.e., diameter and strake). For purposes of a typical step, about 0.3° of angular travel is realized. Over 180 degrees of travel angularly approximately 600 incremental position changes occur between the positions depicted in FIGS. 6(c) to 6(e).

The controller 124, in the meantime, also continuously monitors the high/low pressure switches 128, 129 in order to maintain pressure in the accumulator 118 within a desired operating range. When the low pressure switch 129 activates, the controller 124 will transmit a signal in order to activate the pump 114, which will add hydraulic fluid to the accumulator 118 from the hydraulic reservoir 110, thereby increasing the volume available and system pressure. The pump 114 will continue operation until the high pressure switch 128 is activated, at which point the controller 124 will transmit a signal to deactivate the pump 114.

Similarly, the actuator can be controlled for continuous movement using the herein described circuit in which the actuator can provide a continuous sustained movement or retraction from the west-facing position, FIG. 6(e), to the stow position, FIG. 6(b), at the end of the day, from the stow position to the east-facing position, FIG. 6(c), at the start of a sun tracking phase and/or from any angular position to the maintenance position, FIG. 6(a), as needed. According to this exemplary embodiment, stow and maintenance positions are defined at 30° and 60° from the east-facing horizontal position, respectively. To travel to these positions, the hydraulic circuit 36 receives a continuous command to travel in the clockwise direction. Through the stroke, the pump 114 will likely switch on and off several times over the range of travel in order to recharge the accumulator 118 as sensed by the high/low pressure switches 128, 129 in the manner noted previously. Confirmation of achieving the stow and/or maintenance position, FIG. 6(b), FIG. 6(c), can be made be external or internal feedback, for example, using limit switches (not shown).

As noted above, the central control of the pump 114 and the directional control valve 138 of the actuator control circuit 36 is accomplished by means of the controller 124. According to this exemplary embodiment, varying levels or modes of controlled operation can be provided for purposes of moving the trough, e.g., for sun tracking. For example and in a first mode, the actuator position would be unknown to the controller 124. An absolute position sensor reference (e.g., encoder, inclinometer or other similar sensor means 160, FIG. 1) closes the position loop. A specific pulsing index and direction signal would then be input to the control circuit (controller 124), thereby creating an incremental movement of the actuator (cylinder 24) based on the inputted signal.

Figure 7:
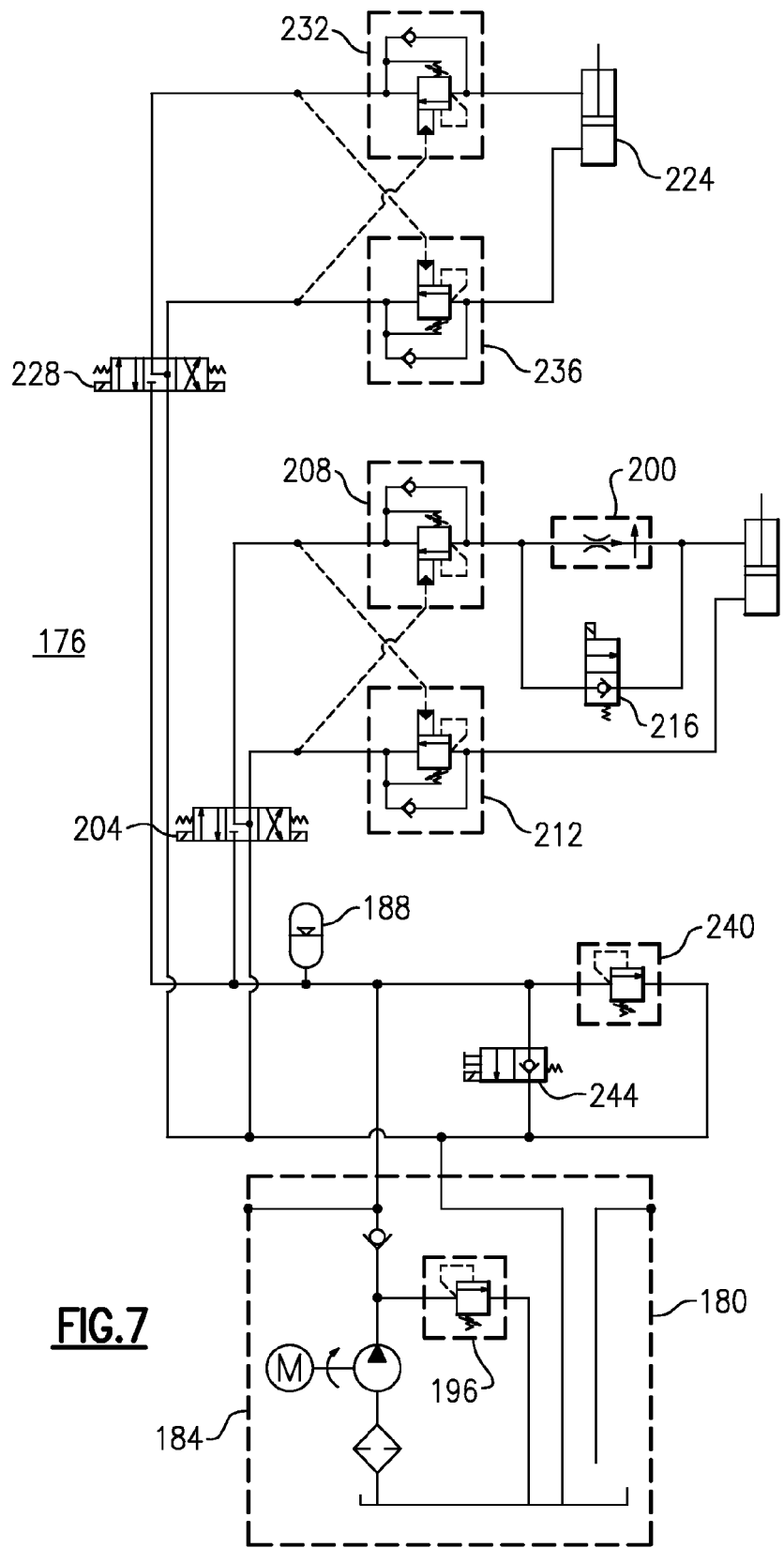
FIG. 7 is a functional schematic diagram of an alternative hydraulic pressurization assembly for use with the position controlling system of the present invention.

An alternative actuator control circuit 176 for purposes of the present invention is depicted in FIG. 7. As in the preceding, this control circuit 176 can be housed in an enclosure (not shown) and includes a plurality of components that are commonly interconnected by a resident controller (not shown) similarly to the circuit of FIG. 5. A hydraulic reservoir 180 acting as a fluid (power) supply for the circuit 176 retains a quantity of hydraulic fluid for purposes of the double-acting hydraulic cylinder 24. The reservoir 180 is enabled by an electric-motor driven or other suitably powered pump 184 disposed in relation to the reservoir 180 to enable fluidic communication wherein a hydraulic accumulator 188 is fluidically and intermediately disposed between the hydraulic cylinder 24 and the reservoir 180. A check valve 192 and relief valve 196 are further provided in relation to the hydraulic accumulator 188, pump 184 and the hydraulic reservoir 180.

Similarly to the preceding actuator control circuit 36, FIG. 5, a flow control valve 200, such as a fixed orifice pressure compensated, restrictive type, hydraulic flow regulating valve, is disposed in relation to a directional control valve 204 and the hydraulic accumulator 188 to enable fluid from the accumulator under pressure under a constant flow rate to be provided, as needed, to the hydraulic cylinder 24. According to this embodiment, the directional control valve 204 is a four-way solenoid directional valve, although other suitable versions can be utilized. The fluid level is maintained within the hydraulic cylinder 24 according to this version by a pair of counter balance valves 208, 212, such as those manufactured by Sun Hydraulics in which the valves 208, 212 are disposed between in parallel relation to the hydraulic cylinder. The valves 208, 212 are disposed intermediately in relation to the flow control valve 200, the hydraulic cylinder 24 and the directional control valve 204 in order to provide enhanced thermal pressure relief in lieu of the locking valve 142, FIG. 5, of the previous circuit embodiment.

A by-pass check valve 216 is further disposed in relation to the hydraulic cylinder 24 to create a hi-speed by-pass mode, as needed, for maintenance and storage, in lieu of the flow control valve 200.

According to this embodiment, an optional locking cylinder 224 is disposed in relation to the hydraulic accumulator 188, the locking cylinder 224 being enabled by a directional control valve 228 and a pair of counterbalance valves 232, 236 disposed in parallel in relation to the locking cylinder 224, the second locking circuit further including automatic and manual relief valves 240, 244, respectively. The locking cylinder 224 is substantially smaller than the main cylinder 24, wherein the purpose of the locking cylinder is to move a bar or pin (not shown) into a detent (not shown) in the output crank of the pivot arm 68. The foregoing operation locks the linkage to a base or tower 76, FIG. 6, directly thereby removing the other parts of the linkage mechanical linkage assembly and the main cylinder 24 from any substantial load bearing during periods of high wind conditions which could ordinarily "back drive" the actuator.

In terms of operation and to initiate movement of the actuator using the herein described circuit, the controller (not shown in FIG. 7), will receive a command to step the linkage assembly 40, FIG. 1, from a previous position to a new incremental position. For purposes of an extending motion of the actuator, the controller closes a relay for the proper solenoid on the directional control valve 204 for a predetermined time period. This closure enables a flow of fluid from the hydraulic accumulator 188 from the hydraulic accumulator 188 into the confines of the hydraulic cylinder 24. As in the previous embodiment, the flow control valve 200 is pressure compensated in order to meter the flow rate of hydraulic fluid (regardless of upstream pressure) to a fixed rate that must be know for calculating the duration of the solenoid command. When the solenoid releases, the parallel pair of counterbalance valves 208, 212 hold the pressure on both sides of the cylinder 24 until the next actuator movement wherein pressure at the inlet side results in free fluid flow in the forward direction (i.e., to the cylinder 24) through the internal check valve. Reverse flow is blocked or prevented until the force of the adjustable spring of the valve is exceeded by either: 1) pilot pressure from the inlet side of the paired counterbalance valve, 2) high reverse pressure (internally piloted from the cylinder side) due to thermal expansion or high external loading or 3) a combination of 1) and 2).

The by-pass check valve 216 is enabled when incremental motion is not required, such as moving the solar collector to a stow or maintenance position.

As previously noted, the locking portion of the circuit 176 is similar to the main hydraulic circuit described above in its use of a four-way directional valve 228 to control the direction of travel of the locking cylinder 224. Pressure is maintained within the locking cylinder using the separate pair of counterbalance valves 232, 236 that are arranged in relation to the locking cylinder 224. Unlike the main cylinder 24, a flow control valve is not required in this portion of the circuit 176 in that the operation of the locking cylinder 224 is simply an engaged or unengaged condition.

In an alternative mode of controlled operation of this system, an absolute position sensor input, sensor means 160, FIG. 1, is specifically connected to that of the controller 124. In this mode, a position set point is provided to the controller 124. This position set point could be either an analog proportional position command or a digital position command that is sent over a digital communications interface, thereby initiating incremental movement of the actuator (cylinder 24).

In yet another alternative mode of controlled operation, the controller 124 can include specific knowledge of the actuator position from an absolute position sensor reference (e.g., encoder, inclinometer or similar means—not shown). A position set point is then derived by the controller 124 based upon Date/Time of Day information, map coordinates (initial configuration/data input) and solar motion data (look up tables).

Parts List For Figs. 1-7

20 drive system
24 hydraulic cylinder
28 output arm or rod
32 hydraulic ram
36 actuator control circuit
40 mechanical linkage assembly
50 solar collector
55 linkage arm 56 linkage arm plate
57 linkage arm plate
60 prismatic joint
64 first pivot arm
68 second pivot arm
71 pin, pivot
72 support, fixed
73 pin, pivot
75 pin, pivot
76 movable trough or trough portion
77 opening
79 opening
81 opening
83 opening
85 opening
87 opening
89 opening
91 opening, first pivot arm
93 opening, second pivot arm
95 opening, first pivot arm
97 cylindrical projection, support
99 opening, second pivot arm
101 rod
110 hydraulic reservoir
114 pump
118 hydraulic accumulator
124 controller
128 pressure switch, high
129 pressure switch, low
132 flow control valve
138 directional control valve
142 locking valve
146 check valve
150 relief valve
160 sensor means
176 actuator control circuit
180 hydraulic reservoir
184 pump
188 hydraulic accumulator
192 check valve
196 relief valve
200 flow control valve
204 directional control valve
208 counterbalance valve
212 counterbalance valve
216 bypass check valve
224 locking cylinder
228 directional control valve
232 counterbalance valve
236 counterbalance valve
240 automatic relief valve
244 manual relief valve Though this description is based upon certain exemplary embodiments, it will be readily apparent to those of sufficient skill that there other numerous variations and modifications that can be made utilizing the intended ambits of the invention, as defined by the following claims:

The invention claimed is:

1. A system for controlling the rotational position of a solar collector trough, said trough being rotatably supported for movement over an angular range of motion of greater than 180 degrees based on the relative position of the sun to the trough, said position controlling system comprising:
  a single hydraulic cylinder having an output end;
  a linkage assembly interconnecting the output end of said cylinder and said trough, said linkage assembly comprising:
    a linkage member having a distal end and a proximal end; and
    a pair of pivot arms attached to said linkage member, said pair of pivot arms including a first pivot arm and a second pivot arm each pivotally attached to said at least one linkage member and said trough, in which the first pivot arm is pivotally attached to an intermediate portion of said linkage member and the second pivot arm is pivotally attached to the distal end of said linkage member wherein the fixed attachment of said first pivot arm and said second pivot arm form respective parallel horizontal first and second pivot axes and said output end of said hydraulic cylinder is pivotally attached to the proximal end of said linkage member creating a third pivot axis enabling said trough to be entirely movable over said angular range of motion based totally on the linear movement of the output end of said hydraulic cylinder; and
  a hydraulic pressurization system for controlling the displacement of said output end of said cylinder.

2. An actuator-based system for controlling the rotational position of a solar collector trough, said trough being rotatably supported for movement over an angular range of motion in excess of 180 degrees based on the relative position of the sun to the trough, said position controlling system comprising:
  a single hydraulic cylinder having an output end;
  a linkage assembly interconnecting the output end of said cylinder and said trough, said linkage assembly comprising:
    a linkage member having a distal end and a proximal end; and
    a pair of pivot arms attached to said linkage member, said pair of pivot arms including a first pivot arm and a second pivot arm, said first pivot arm being pivotally attached to a fixed portion of said trough at one end of said arm and pivotally attached to an intermediate portion of said linkage member at an opposite end thereof, said second pivot arm being pivotally attached to a rotatably supported portion of said trough at one end and pivotally attached to the distal end of said at least one linkage member at an opposite end, said linkage member being pivotally attached to said output end of said cylinder at said proximal end and wherein axial movement of said output end enables said trough to be rotated over said angular range of motion wherein the attachment of said first pivot arm to the fixed portion of said trough forms a first horizontal pivot axis, the attachment of said second pivot arm to the rotatably movable portion of said trough forms a second pivot horizontal axis parallel to said first horizontal pivot axis and the pivotal attachment of said linkage member to said output end of said cylinder forms a third horizontal pivot axis parallel to the first and second horizontal pivot axes, said first pivot arm having a substantially L-shaped configuration to enable rotation of said collector trough beyond 180 degrees without interference between said linkage member and said pivot arms; and
  a hydraulic pressurization system for controlling the displacement of said output end of said cylinder.

3. A system as recited in claim 2, wherein said angular range of motion is at least 240 degrees.

4. A system as recited in claim 2, wherein said hydraulic pressurization system includes at least one pump, a hydraulic fluid supply connected to said cylinder and said pump and valve means for directing the flow of hydraulic fluid from said hydraulic fluid supply to and from said cylinder.

5. A system as recited in claim 4, wherein said valve means includes a directional control valve fluidly connected to said cylinder, wherein actuation of said directional valve will cause hydraulic fluid flow from said fluid supply to said cylinder, said valve means further including a pressure compensated flow control valve for maintaining a fixed rate of fluid flow during the time period said directional valve is actuated.

6. A system as recited in claim 5, wherein said hydraulic pressurization system includes a controller that receives output to selectively actuate said hydraulic pressurization system to incrementally position said trough.

7. A system as recited in claim 6, wherein said controller receives output from sensing means for determining the relative position of the sun.

8. A system as recited in claim 6, wherein said directional control valve is actuated for a predetermined time interval.

9. A system as recited in claim 6, wherein said fluid supply includes a hydraulic reservoir and a fluid accumulator, said accumulator being connected to said hydraulic reservoir and said pump and serving as the fluid supply for said cylinder under said valve means.

10. A system as recited in claim 9, including means connected to said controller for determining the state of said accumulator for replenishing same with hydraulic fluid.

11. A system as recited in claim 10, wherein said determining means includes pressure sensing means disposed in relation to said accumulator to determine the pressure thereof.

12. A system as recited in claim 11, wherein said pressure sensing means includes high and low pressure switches.

13. A system as recited in claim 6, wherein said valve means further includes a pair of counter balance valves disposed in parallel between said directional valve and said cylinder.

14. A system as recited in claim 6, wherein said directional valve is a solenoid directional valve.

15. A system as recited in claim 6, wherein said directional valve is a four-way directional solenoid valve.

16. A system as recited in claim 1, wherein movement of said trough is incrementally enabled to track sun position as well as continuous movement over the angular range of motion to each of a stow and a maintenance position as needed.

17. A system as recited to claim 1, wherein said at least one linkage member is pivotally attached to said output end via a prismatic joint.

18. A system as recited in claim 1, wherein each of said pivot arms are attached to said at least one linkage member and said trough by revolute joints.

* * * * *